United States Patent
Duan et al.

(10) Patent No.: US 7,913,356 B2
(45) Date of Patent: *Mar. 29, 2011

(54) HINGE ASSEMBLY FOR FOLDABLE ELECTRONIC DEVICES

(75) Inventors: Chao Duan, Shenzhen (CN); Chia-Hua Chen, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 12/141,223

(22) Filed: Jun. 18, 2008

(65) Prior Publication Data

US 2009/0183339 A1    Jul. 23, 2009

(30) Foreign Application Priority Data

Jan. 23, 2008    (CN) .......................... 2008 1 0300195

(51) Int. Cl.
*E05D 5/12* (2006.01)

(52) U.S. Cl. ................. 16/303; 16/307; 16/316; 16/330

(58) Field of Classification Search .................... 16/303, 16/304, 307, 284, 285, 277, 381, 316, 309, 16/310, 311, 312, 317, 318; 379/433.13; 248/920–923; 455/575.3

See application file for complete search history.

(56) References Cited

U.S. PATENT DOCUMENTS

| | | | | |
|---|---|---|---|---|
| 309,039 A | * | 12/1884 | Foster .............................. | 16/316 |
| 4,391,020 A | * | 7/1983 | Hsu ................................. | 16/314 |
| 5,205,015 A | * | 4/1993 | Huang ............................. | 16/50 |
| 5,715,576 A | * | 2/1998 | Liu ................................. | 16/342 |
| 5,799,371 A | * | 9/1998 | Lin ................................. | 16/330 |
| 5,970,819 A | * | 10/1999 | Katoh ............................. | 74/531 |
| 6,115,886 A | * | 9/2000 | Fujita .............................. | 16/330 |
| 6,493,542 B1 | * | 12/2002 | Frohlund ....................... | 455/90.1 |
| 7,100,239 B2 | * | 9/2006 | Duan et al. ...................... | 16/303 |
| 7,100,244 B2 | * | 9/2006 | Qin et al. ........................ | 16/330 |
| 7,117,563 B2 | * | 10/2006 | Chen et al. ..................... | 16/330 |
| 7,124,472 B2 | * | 10/2006 | Duan et al. ...................... | 16/303 |
| 7,334,294 B2 | * | 2/2008 | Liu et al. ........................ | 16/307 |
| 7,444,715 B2 | * | 11/2008 | Tu et al. .......................... | 16/284 |
| 7,513,010 B2 | * | 4/2009 | Duan et al. ...................... | 16/330 |
| 7,532,459 B2 | * | 5/2009 | Son et al. ........................ | 16/367 |
| 7,561,687 B2 | * | 7/2009 | Duan et al. ............... | 379/433.13 |
| 7,565,717 B2 | * | 7/2009 | Duan et al. ...................... | 16/303 |
| 2003/0172494 A1 | * | 9/2003 | Oshima et al. ................. | 16/285 |
| 2005/0188503 A1 | * | 9/2005 | Duan et al. ...................... | 16/303 |
| 2006/0045261 A1 | * | 3/2006 | Duan et al. ............... | 379/433.13 |
| 2006/0085947 A1 | * | 4/2006 | Ge et al. ......................... | 16/303 |
| 2006/0117529 A1 | * | 6/2006 | Duan et al. ...................... | 16/303 |
| 2006/0242794 A1 | * | 11/2006 | Duan et al. ...................... | 16/303 |
| 2009/0009934 A1 | * | 1/2009 | Chen et al. ..................... | 361/679 |

* cited by examiner

*Primary Examiner* — Daniel P Stodola
*Assistant Examiner* — Rowland D Do
(74) *Attorney, Agent, or Firm* — Steven M. Reiss

(57) ABSTRACT

A hinge assembly (10) includes a shaft (12) and a follower (16), wherein one of the shaft and the follower defines a thread (122), the other of the shaft and the follower includes at least one resisting portion (166). The thread is separately formed from one of the shaft and the follower with the thread and the shaft and the follower slide and rotate relative to each other. Since the thread is separately formed therewith, the thread may be formed by injection mold. This manufacture method is easy. In addition, the thread may be made of wear resistant material. The thread is not easy to be abraded, thereby the work being stable.

14 Claims, 8 Drawing Sheets

HINGE ASSEMBLY FOR FOLDABLE ELECTRONIC DEVICES

BACKGROUND OF THE INVENTION

1. Field of the Invention

The present invention relates to hinge assemblies and, particularly, to hinge assemblies for foldable electronic devices, such as mobile phones and portable computers.

2. Description of Related Art

Presently, perhaps the most popular portable electronic device in the marketplace is the foldable mobile phone, which generally includes a cover section and a body section. The cover section and the body section are rotatably interconnected through a hinge assembly, for switching the telephone between an in-use position and a closed position.

One kind of hinge assembly employs a cam and a follower, which makes the cover section fold outward from the body section and then holds the cover section in the open position. The hinge assembly typically includes a shaft, a rotatable element, and a spring. The shaft has a thread thereon, and the rotatable element forms a protrusion. When assembled, the rotatable element is placed on the shaft and the protrusion engages with the thread of the shaft. The spring is placed around the shaft, and resists the rotatable element. The rotatable element may rotate and slide along the thread under the pressing force of the spring.

However, although the hinge assembly may achieve the opening and closing of the foldable electronic device, forming the thread on the shaft is complicated and expensive. In addition, the thread is directly machined on the shaft. The material of the shaft and the thread is the same so the property of the thread cannot satisfy resist-abraded requirement. The threads can easily be damaged. The damage may eventually lead to premature malfunction or failure of the foldable electronic device.

Therefore, a new hinge assembly is desired in order to overcome the above-described shortcoming.

BRIEF DESCRIPTION OF THE DRAWINGS

Many aspects of the present hinge assembly can be better understood with reference to the following drawings. The components in the drawings are not necessarily drawn to scale, the emphasis instead being placed upon clearly illustrating the principles of the present hinge assembly. Moreover, in the drawings, like reference numerals designate corresponding parts throughout the several views, in which.

DETAILED DESCRIPTION OF THE EMBODIMENTS

The present hinge assembly is suitable for a foldable electronic device such as a flip-type mobile phone, for pivotably coupling a cover section and a body section. It is to be understood, however, that the hinge assembly could be advantageously used in other environments (e.g. cabinet doors).

Figure 1:
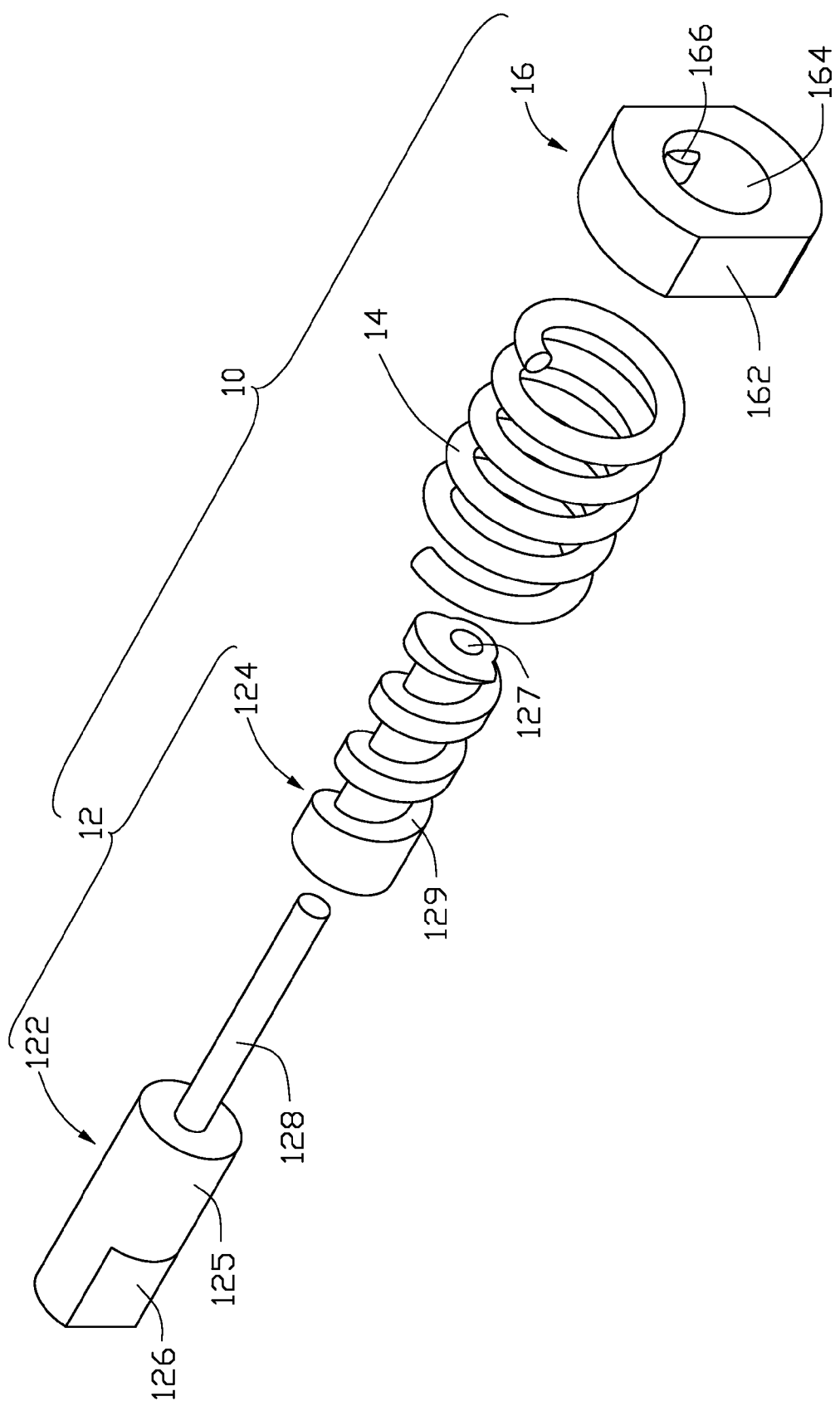
FIG. 1 is an exploded, isometric view of a first exemplary embodiment of the hinge assembly.

Referring now to FIG. 1, a hinge assembly 10 according to a first exemplary embodiment is provided. The hinge assembly 10 includes a shaft assembly 12, a spring 14, and a follower 16.

The shaft assembly 12 includes a body portion 122 and a screw portion 124. The body portion 122 is a stepped cylinder, and is made of metal such as steel. The body portion 122 includes a main body section 125 and an extending body section 128. The main body section 125 is substantially cylindrical, and includes a deformed end 126 configured for connecting a body section of a foldable electronic device. The extending body section 128 is coaxial with the main body section 125. The extending body section 128 has a smaller diameter than the main body section 125. The screw portion 124 is made of wear resistant material. For example, the screw portion 124 can be made of plastic. An outer diameter of the screw portion 124 is substantially equal to that of the main body section 125. The screw portion 124 has a singe thread 129, which can be a raised helical or spiral rib/ridge. The screw portion 124 defines a connecting hole 127 along its longitudinal axis that receives the extending body section 128 therein.

The spring 14 is preferably helical and metallic. The spring 14 has an inner diameter larger than a diameter of the main body section 125 and the screw portion 124. Thus, the spring 14 can be placed around the main body section 125 and the screw portion 124.

Figure 2:
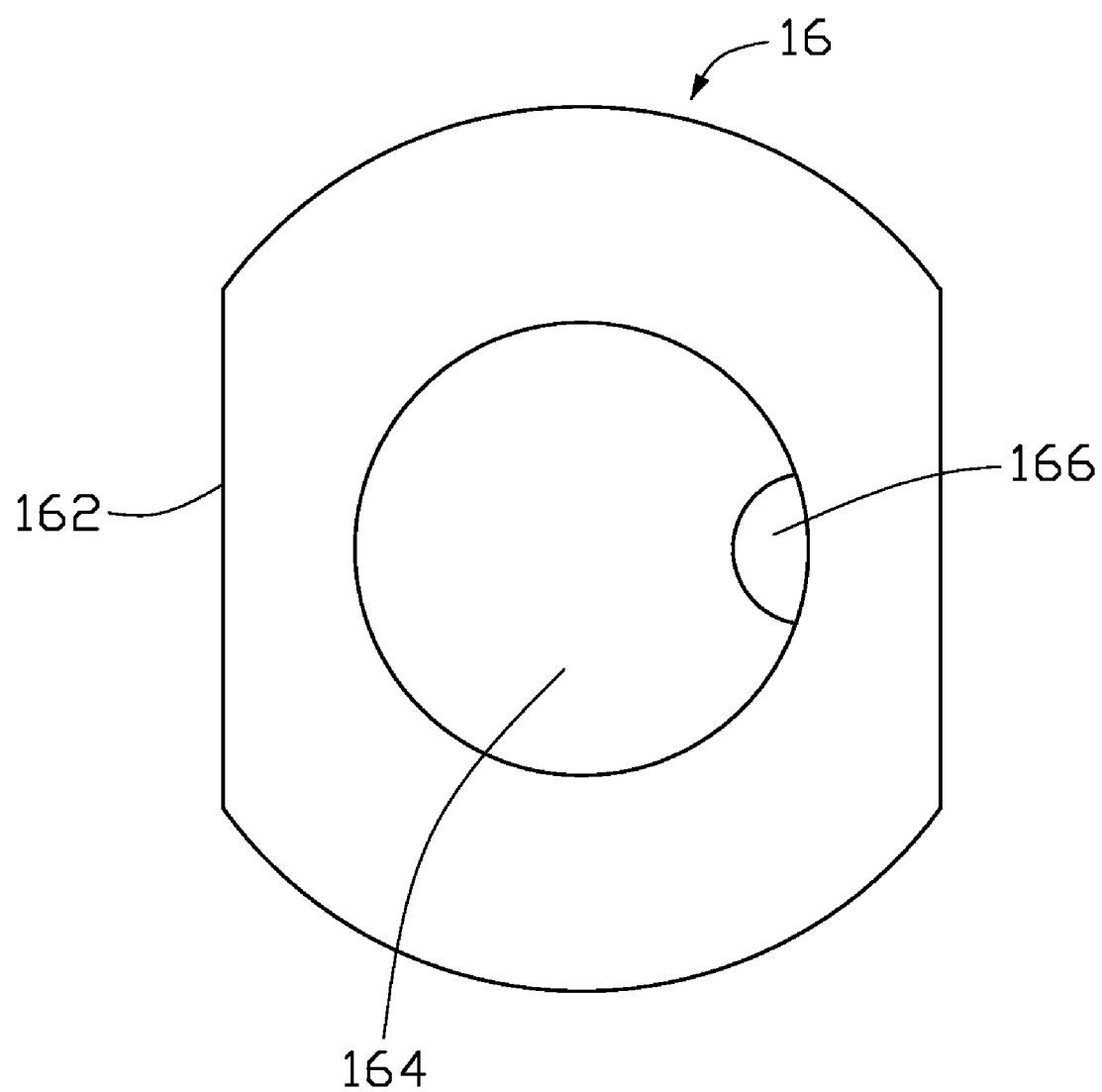
FIG. 2 is a front view of a follower of the hinge assembly shown in FIG. 1.

Referring now to FIG. 2, the follower 16 is generally cylindrical and defines a through hole 164. The follower 16 includes two opposite planar outer surfaces 162. A projection 166 is formed in through hole 164 on an inner peripheral wall of the follower 16. The projection 166 will be engaged in the thread 129 of the screw portion 124. The projection 166 may be substantially semi-cylindrical and include an arcuate surface facing a center of the through hole 164.

Figure 3:
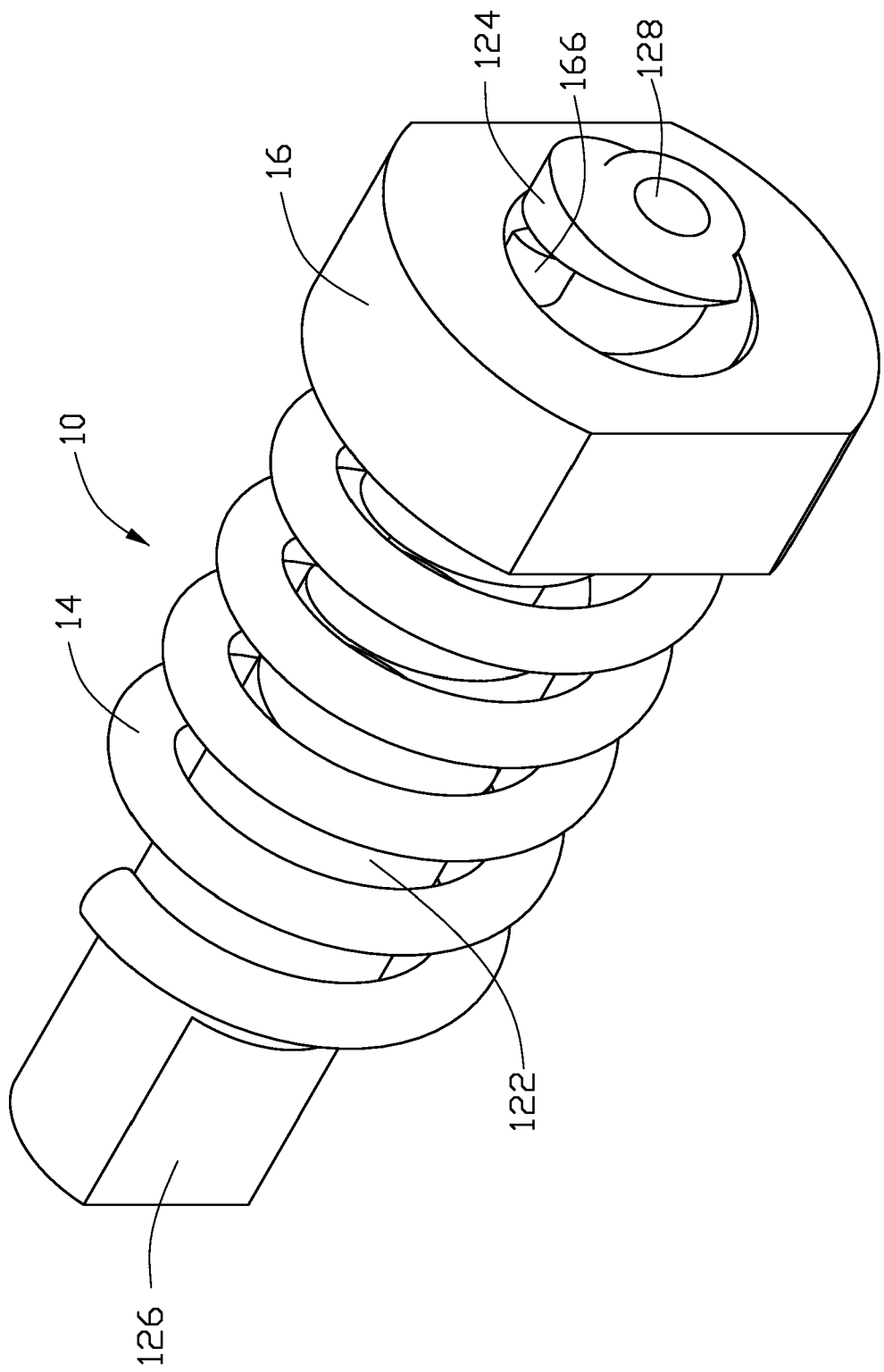
FIG. 3 is an assembled view of the hinge assembly shown in FIG. 1.

Referring to FIG. 3, in assembly, firstly, the extending body section 128 is fixed to body portion 122. This can be achieved by coating the extending body portion 128 with adhesive, and inserting the extending body portion 128 into the connecting hole 127 of the screw portion 124. The spring 14 is placed around the body portion 122 and the screw portion 124. Then, the follower 16 by the through hole 164 is placed around the screw portion 124, and the projection 166 engages with the thread 129 of the screw portion 124. A thread lead angle of the thread 129 should be larger than a friction angle thereof so when an axial force of the spring 14 is applied to the follower 16, the projection 166 may overcome the frictional force of the thread 129 to slide and rotate along the screw portion 124.

Figure 4:
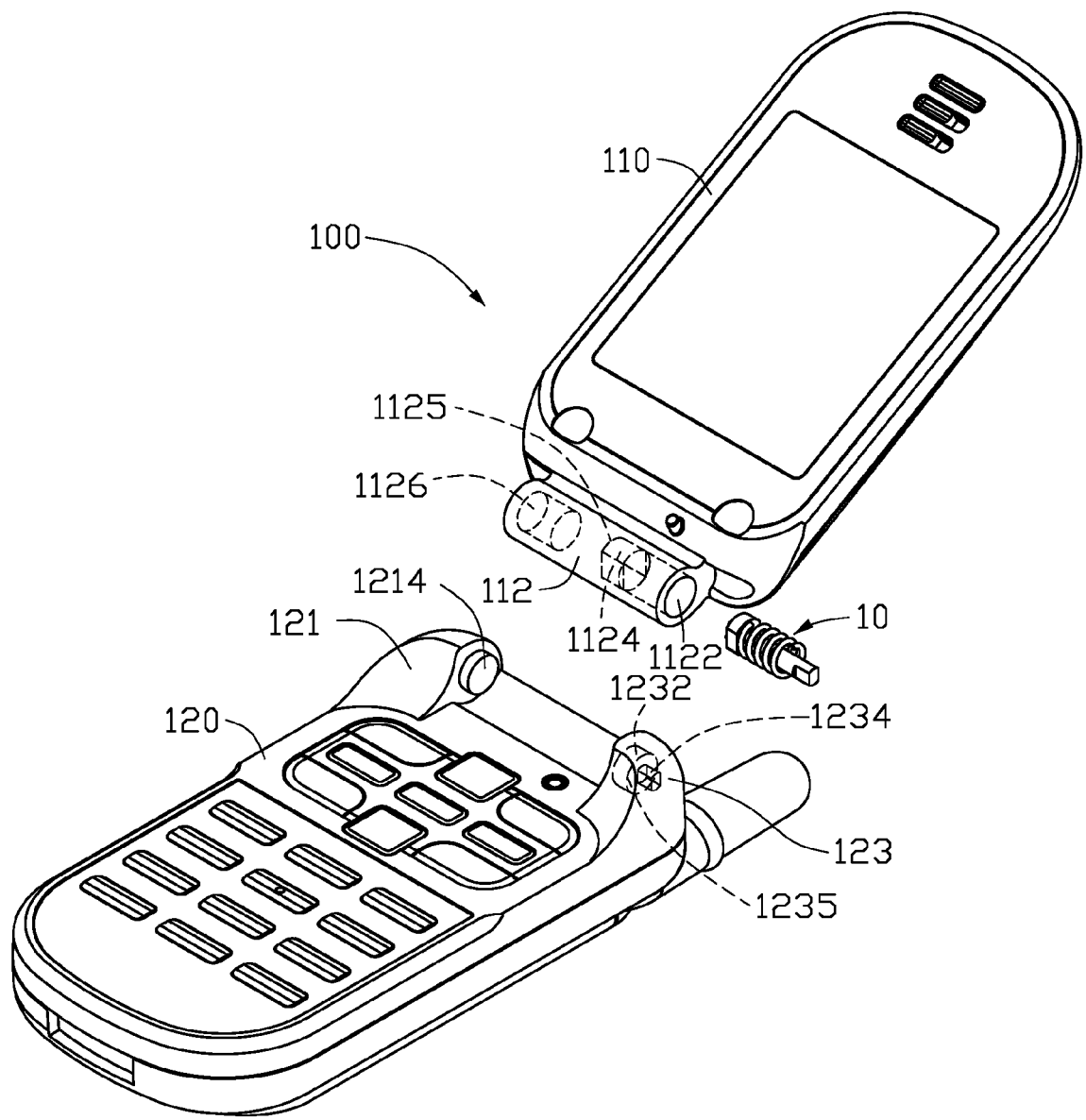
FIG. 4 is an exploded, isometric view of the first exemplary embodiment of the hinge assembly shown in FIG. 1, as used in a mobile phone.

When the hinge assembly 10 is applied in a mobile phone including a cover section and a body section, the body portion 122 of the shaft 12 is mounted to the cover section and the follower 16 is mounted to the body section 120. Referring to FIG. 4, the mobile phone 100 includes a cover section 110 and a body section 120.

The cover section 110 has a connecting portion 112 at one end thereof. The connecting portion 112 defines a receiving cavity 1122 and a first reverse rotating groove 1124 at one end thereof. The receiving cavity 1122 is adjacent to the first reverse rotating groove 1124. The connecting portion 112 has a bottom wall 1125 at one side of the first reverse rotating groove 1124. The connecting portion 112 defines a cylindrical groove 1126 at the other end on the opposite side of the receiving cavity 1122.

The body section 120 has two opposite engaging portion 121, 123 formed at end thereof for connecting to the connection portion 112 of the cover section 110. The engaging portion 123 defines a retaining groove 1232 and a second reverse rotating groove 1234 at one side thereof facing the engaging portion 121. The engaging portion 121 includes a connecting disk 1214 at one side thereof and facing retaining groove 1232 and the second reverse rotating groove 1234.

Figure 5:
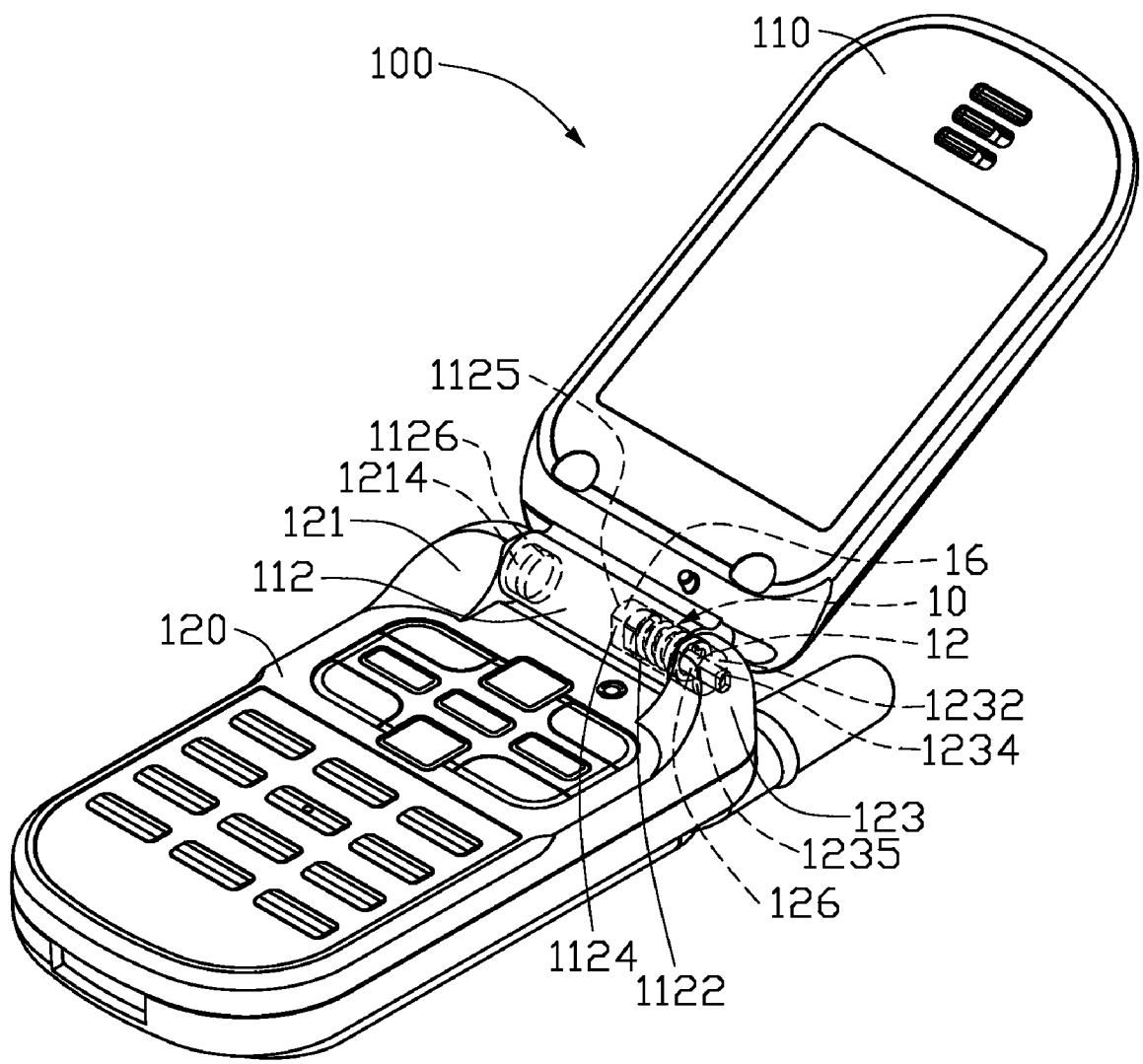
FIG. 5 is an assembled view of the present hinge assembly of FIG. 1, applied in the mobile phone.

In FIG. 5, mobile phone 100 is assembled using the hinge assembly 10. The end of the assembled hinge assembly 10 with the follower 16 is inserted into the receiving cavity 1122. The follower 16 is engaged in the first reverse rotating groove 1124 via the planar surfaces 162. The deformed end 126 of the shaft 12 is exposed from the receiving cavity 1122.

Then, the connecting portion 112 of the cover section 110 is positioned between the two engaging portions 121,123. The connecting disk 1214 of the body section 120 rotatably engages the cylindrical groove 1126, and the deformed end 126 engages in the second reverse rotating groove 1234. The cover section 110 can now rotate relative to the body section 120 between an open position and a closed position via the hinge assembly 10.

In an initial state, the cover section 110 is closed relative to the body section 120. The follower 16 cannot rotate relative to the cover section 110, but can slide relative to the cover section 110. The shaft 12 cannot rotate relative to the body section 120. One end of the spring 14 resists a wall of the retaining groove 1232, and the other end of the spring 14 resists the follower 16. The spring 14 is in a compressed state, and the follower 16 has the tendency to rotate relative to the shaft 12 under an axial force provided by the spring 14. However, the cover section 110 or the follower 16 is locked by a latch mechanism (not shown) so that the cover section 110 cannot rotate relative to the body section 120.

When opening the cover section 110, the latch mechanism is unlocked, and the cover section 110 and the follower 16 are released from the limitation of the latch mechanism. Then, the spring 14 acts on the follower 16, making the follower 16 rotate and slide axially along the shaft 12 under the continuous engagement between the projection 166 and the screw portion 124. As the follower 16 slides, the spring 14 expands. The follower 16 does not stop sliding until it reaches the bottom wall 1125 inside the first reverse rotating groove 1124. Thus, the cover section 110 is automatically opened relative to the body section 120 when the latch mechanism is unlocked.

When the cover section 110 rotates from the open position to the closed position, the follower 16 rotates relative to the shaft 12. Simultaneously, the follower 16 moves axially along the shaft 12 and compresses the spring 14. The cover section 110 rotates continuously until the cover section 110 is locked by the latch mechanism. When the cover section 110 is locked by the latch mechanism, the compressed spring 14 retains elastic energy that is used to automatically open the cover section 110.

In the embodiment described above, the screw portion 124 may be easily formed by injection molding. Additionally, the screw portion 124 is not easily abraded, therefore the stability of the hinge assembly is improved.

Figure 6:
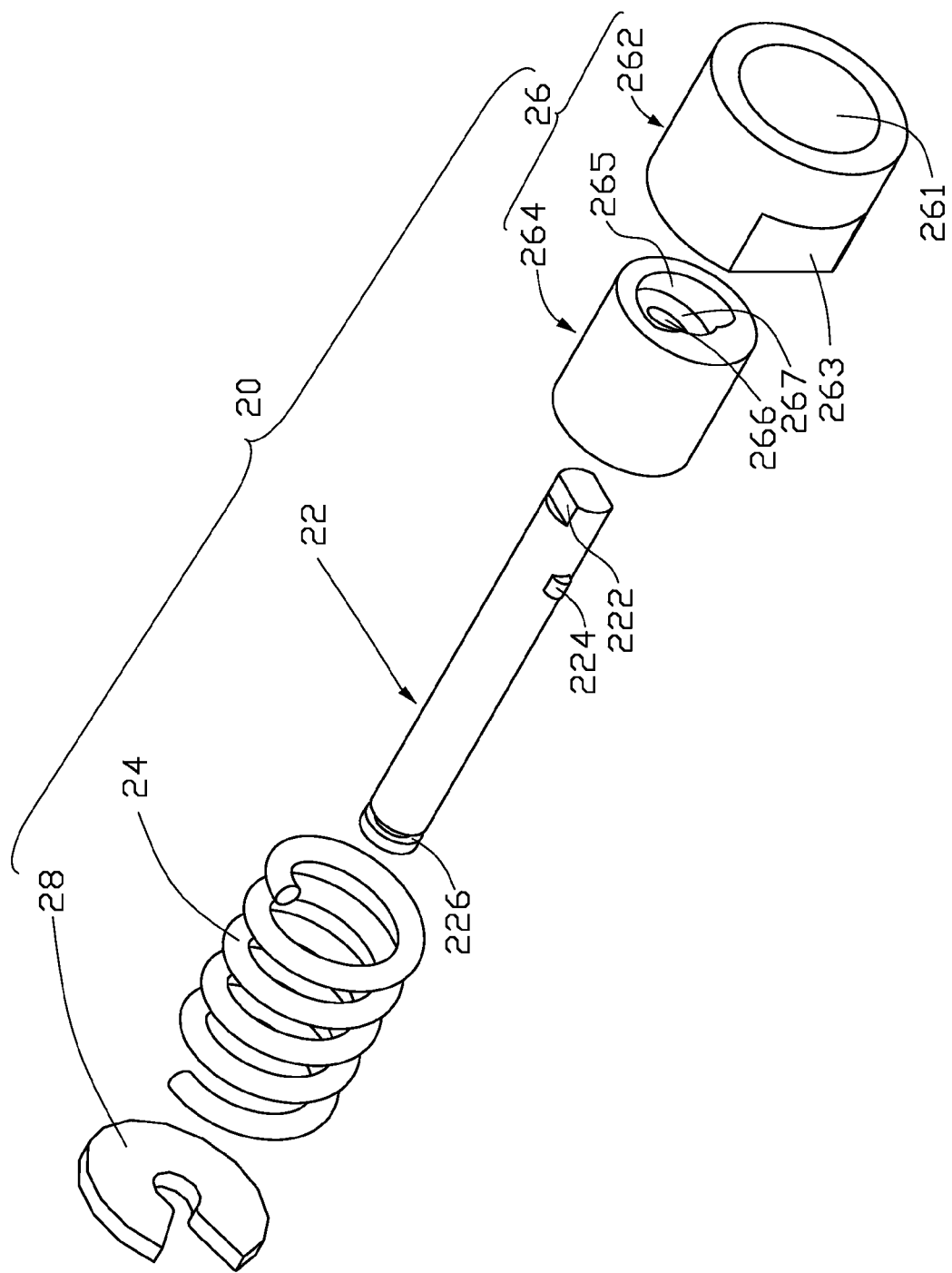
FIG. 6 is an exploded, isometric view of a second exemplary embodiment of the hinge assembly.

FIG. 6 shows a hinge assembly 20 according to a second exemplary embodiment. The hinge assembly 20 includes a shaft 22, a spring 24, a follower 26, and a locking element 28. The shaft 22 includes a deformed end 222 at one end thereof, and a ring groove 226 at the other end thereof. The deformed end 222 of the shaft 22 engages the body section of the mobile phone, and cannot rotate relative to the body section. A projection 224 is formed at the shaft 12 adjacent to the deformed end 222. The projection 224 is substantially semicircular.

The spring 24 is preferably helical and metallic, and can be located around the shaft 22. The follower 26 is generally cylindrical.

The follower 26 includes a sleeve 262 and a screw portion 264. The sleeve 262 is a hollow cylinder, and includes two opposite outer planar surfaces 263. The sleeve 262 defines a containing through-hole 261. The screw portion 264 is substantially cylindrical, and has a receiving hole 266 surrounded by an inner circumferential wall 265. The inner circumferential wall 265 forms a thread 267. The thread 267 is a singe thread, which is a raised helical or spiral rib/ridge around a center of the receiving hole 266. The sleeve 262 may be placed around the screw portion 264, and then the sleeve 262 and the screw portion 264 are placed around the shaft 22 by the receiving hole 266, with the projection 224 engaging with the thread 267 of the screw portion 264. The sleeve 262 is made of metal material such as steel. The screw portion 264 may be made of wear resistant material such as a plastic. Since the sleeve 262 and the screw portion 264 are two separate elements, the screw portion 264 may easily be formed by injection molding. In addition, the screw portion 264 may be made of wear resistant materials. Therefore, when the shaft 22 engages the screw portion 264, the screw portion 264 is not easy abraded.

The locking element 28 is a C-shape ring, and is used for engaging in the ring groove 226 of the shaft 22.

Figure 7:
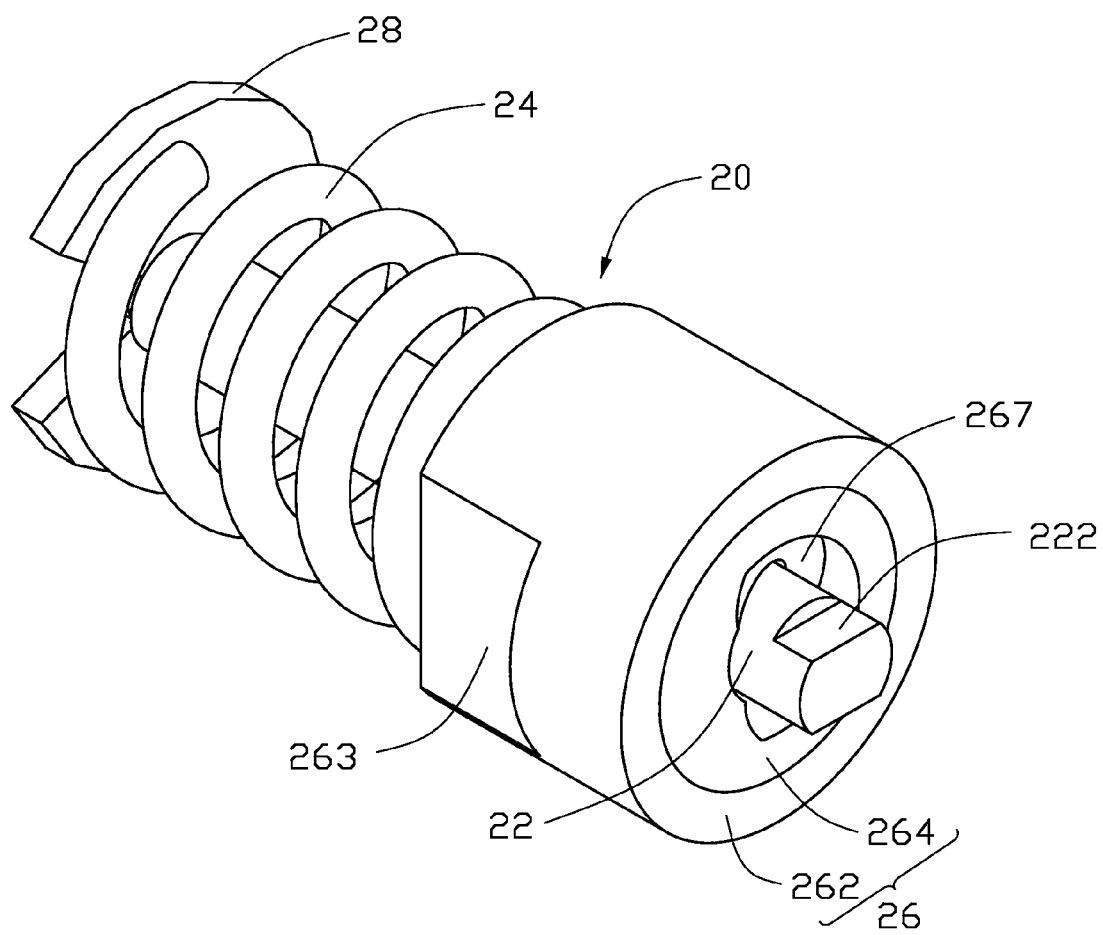
FIG. 7 is an assembled view of the second exemplary embodiment of the hinge assembly shown in FIG. 6.

Referring to FIG. 7, in assembly, the screw portion 264 is fixed to the sleeve 262. This can be achieved by coating an outer circumferential wall of the screw portion 264 with an adhesive and the sleeve 262 placed around the screw portion 264. Then, the locking element 28 is locked in the ring groove 226 of the shaft 22. The spring 24 is placed around the shaft 22 so one end of the spring 24 resists the locking element 28. The shaft 22 passes through the receiving hole 266 of the follower 26, and the projection 224 of the shaft 22 engages in the screw portion 264 of the follower 26. The other end of the spring 24 resists the follower 26. The spring 24 is compressed to accumulate a predetermined spring force. Finally, the hinge assembly 20 is assembled in the mobile phone. The assembled process of the hinge assembly 20 and the mobile phone is similar to the first exemplary embodiment. In use, when either of the follower 26 or the cover section is unlocked, the follower 26 rotates and slides relative to the shaft 22 so that the cover section opens relative to the body section.

Figure 8:
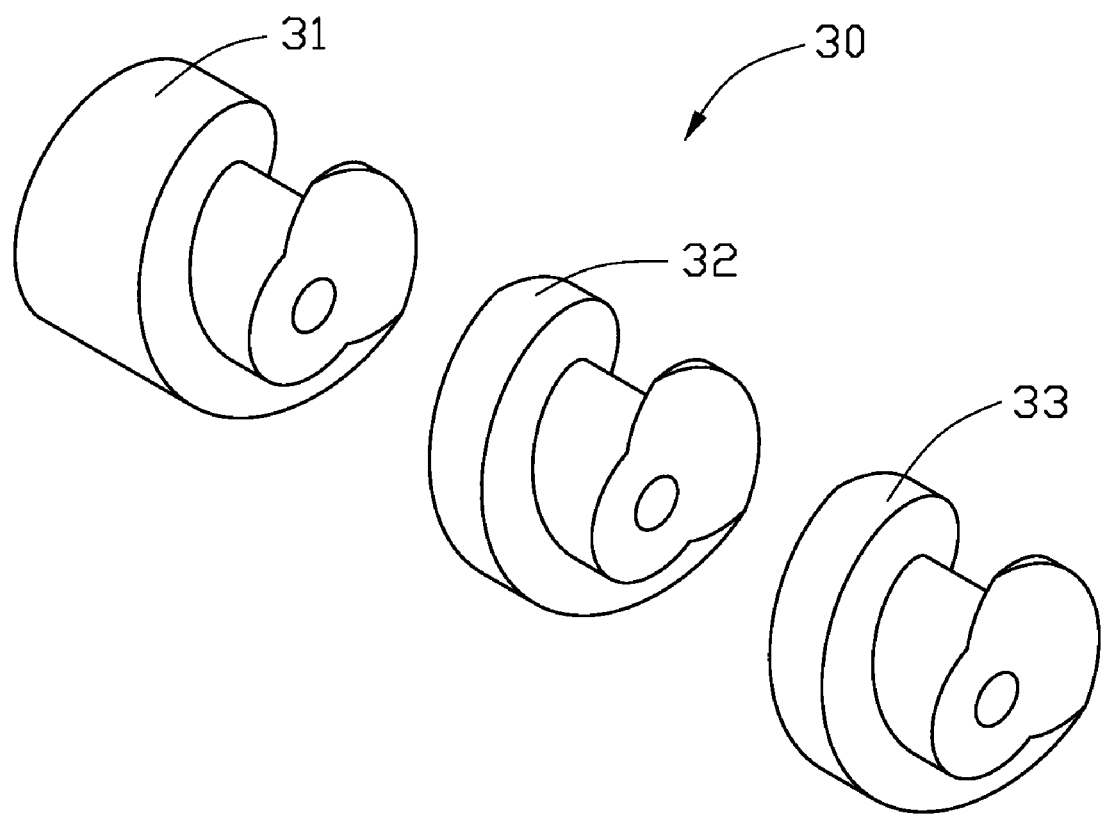
FIG. 8 is an exploded, isometric view of a third exemplary embodiment of the shaft of the hinge assembly.

Referring to FIG. 8, a screw portion 30 is provided according to a present third exemplary embodiment. The follower 46 is generally cylindrical. The screw portion 30 includes three thread units 31, 32, 33. Each thread unit may be made of a thread pitch, and formed by injection molding. Manufacturing each thread unit separately is easier than manufacturing them as a single unit. In use, however, the thread units may be adhered together.

The connection between the body portion 122 and the screw portion 124 may adopt other method. The extending section 128 may be cubic, and the shape of the connecting hole 127 corresponding to the extending section 128. Therefore, the extending section 128 may be tightly engaged in the connecting hole 127 of the body portion 122 to form the connection therewith.

Understandably, the number of threads on the shaft may be more than two. Accordingly, the number of projections in the follower should correspond to the number of threads. If the screw portion has a single thread, the follower may have two projections. The axial and radial distance between the two projections, should correspond to the thread distance of the shaft so that the two projections may engage in the thread of the shaft.

In further alternative embodiments, the spring can be made of a nonmetallic material such as rubber. Furthermore, the spring can instead be made of other kind of elastic element or driving structure such as a resilient cylinder. Understandably, a diameter of the spring may be smaller than that of the shaft. In that case, the spring is not placed around the shaft. Instead, the spring directly resists one end of the shaft for providing a force causing the follower to move relative to the shaft. Alternatively, the spring may be omitted, and an alternative axial push force may be provided for the shaft or the follower so that the shaft and the follower can move relative to each other.

The deformed end of the shaft may be replaced with other configuration securing portion. In addition, the planner faces of the follower may be replaced with other configuration structure.

Alternatively, the shape of the projection is not limited as other configuration functioning a resisting portion for resisting the thread to realize the movement between the shaft and the follower. In addition, the spring may be not limited to resist the body section, and may resist the cover section. Since the body portion and a screw portion are two separate elements, the screw portion may be formed by injection mold. In addition, the screw portion may be made of wear resistance material.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A hinge assembly comprising:
   a shaft assembly including a body portion and a screw portion, the screw portion and the body portion being two separate elements made of different materials, the screw portion being placed around the body portion and fixed with the body portion so that the body portion cannot move or rotate relative to the screw portion, the screw portion defining a thread;
   an unthreaded follower defining a through hole having a substantially smooth inner wall, a projection extending from the smooth inner peripheral wall, the shaft assembly extending through the through hole, the projection engaging with the screw portion of the shaft assembly;
   an elastic element abutting against the follower, the elastic element providing a force causing the follower to slide and rotate relative to the shaft assembly.

2. The hinge assembly as claimed in claim 1, wherein the screw portion is made of wear resistant material.

3. The hinge assembly as claimed in claim 1, wherein the screw portion defines a connecting hole, the body portion includes a main body section and an extending body section, the extending body section is disposed at one end of the main body section, and the extending body section has a smaller diameter than the main body section, and is inserted into the connecting hole of the screw portion.

4. The hinge assembly as claimed in claim 1, wherein the resisting portion is disposed on the shaft, the follower includes a sleeve and the screw portion, the screw portion having a through hole surrounded by an inner circumferential wall defining a thread of the screw portion for engaging the resisting portion.

5. The hinge assembly as claimed in claim 1, wherein one end of the shaft forms a securing portion, the securing portion being a deformed cylinder, and the follower being a cylinder with two planar surfaces.

6. The hinge assembly as claimed in claim 4, wherein the screw portion is made of wear resistant material.

7. The hinge assembly as claimed in claim 5, wherein one end of the shaft forms a locking element, the elastic element being placed around the shaft, and one end of the elastic element resists the follower, and the other end of the elastic element resists the locking element.

8. The hinge assembly as claimed in claim 7, wherein the locking element is a C-shaped ring, one end of the shaft defining a ring groove, and a ring being locked into the ring groove of the shaft.

9. A foldable electronic device having at least two components hinged together by a hinge assembly, the hinge assembly comprising:
   a shaft assembly including a body portion and a screw portion, the screw portion and the body portion being two separate elements made of different materials, the screw portion being placed around the body portion and fixed with the body portion so that the body portion cannot move or rotate relative to the screw portion, the screw portion defining a thread;
   an unthreaded follower defining a through hole having a substantially smooth inner wall, a projection extending from the smooth inner peripheral wall, the shaft assembly extending through the through hole, the projection engaging with the screw portion of the shaft assembly;
   an elastic element abutting against the follower, the elastic element providing a force causing the follower to slide and rotate relative to the shaft assembly.

10. The foldable electronic device as claimed in claim 9, wherein the elastic element is positioned around the shaft, one end of the elastic element resisting the follower, the other end of the elastic element resisting one of two components.

11. The foldable electronic device as claimed in claim 9, wherein the screw portion is made of wear resistant material.

12. The foldable electronic device as claimed in claim 9, wherein the screw portion defines a connecting hole, the body portion includes a main body section and an extending body section, the main extending section is disposed at one end of the main body section, and the extending body section has a smaller diameter than the main body section, and is inserted into the connecting hole of the screw portion.

13. The foldable electronic device as claimed in claim 9, wherein the resisting portion is disposed in the shaft, the follower includes a sleeve and the screw portion, the screw portion has a through hole which is surrounded by an inner circumferential wall, and a thread is defined on the inner circumferential wall of the screw portion for engaging with the resisting portion.

14. The foldable electronic device as claimed in claim 13, wherein the screw portion is made of wear resistant material.

* * * * *